United States Patent
Chapman

(10) Patent No.: US 7,137,747 B2
(45) Date of Patent: Nov. 21, 2006

(54) SHOCK AND VIBRATION ISOLATOR FOR A CAMERA

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 112 days.

(21) Appl. No.: 10/938,021

(22) Filed: Sep. 9, 2004

(65) Prior Publication Data

US 2005/0232625 A1    Oct. 20, 2005

Related U.S. Application Data

(63) Continuation-in-part of application No. 10/826,819, filed on Apr. 16, 2004.

(51) Int. Cl.
*G03B 17/00*    (2006.01)
*F16M 13/02*    (2006.01)

(52) U.S. Cl. .................. 396/428; 248/638; 352/243

(58) Field of Classification Search .............. 396/419, 396/420, 421, 428, 12, 13; 348/373, 375; 352/243; 248/638, 187.1; 212/347, 348
See application file for complete search history.

(56) References Cited

U.S. PATENT DOCUMENTS

| 4,621,786 | A | * | 11/1986 | Greenlee | 396/13 |
| 4,645,320 | A | * | 2/1987 | Muelling et al. | 396/419 |
| 4,685,649 | A | * | 8/1987 | McKay | 248/594 |
| 4,752,791 | A | * | 6/1988 | Allred | 396/13 |
| 4,989,823 | A | * | 2/1991 | Chapman | 248/638 |
| 6,705,773 | B1 | * | 3/2004 | Fix | 396/419 |
| 2003/0147641 | A1 | * | 8/2003 | Haney | 396/419 |

* cited by examiner

*Primary Examiner*—W. B. Perkey
*Assistant Examiner*—Rishi Suthar
(74) *Attorney, Agent, or Firm*—Perkins Coie LLP

(57) ABSTRACT

A shock and vibration isolator for a movie or video camera has a vertical axis system including a base, an arm pivotably attached to the base, and at least one spring connected to the base and to the arm. One or more dampeners are connected to the base and to the arm. A horizontal axis system is supported by the vertical axis system. A leveling linkage connects the vertical and horizontal axis systems. The leveling linkage has adjustment features that allow for compensation of camera lens angulation caused by movement of the camera supported on a vehicle rolling over rough or uneven ground. A camera or camera head is suspended, like a dampened pendulum, on the horizontal axis system.

17 Claims, 15 Drawing Sheets

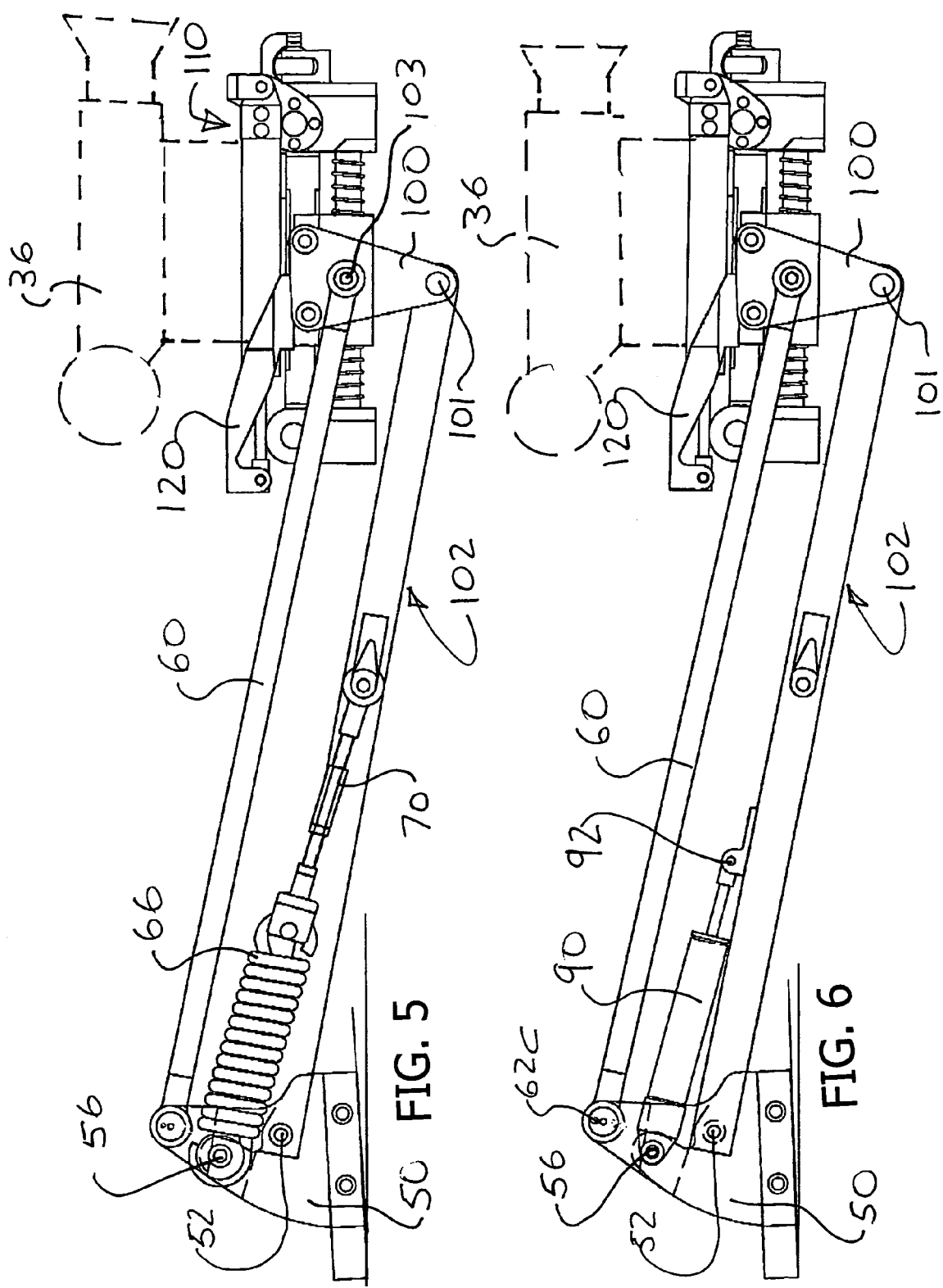

SHOCK AND VIBRATION ISOLATOR FOR A CAMERA

This Application is a Continuation-in-Part of U.S. patent application Ser. No. 10/826,819, filed Apr. 16, 2004, and now pending, and incorporated herein by reference.

BACKGROUND OF INVENTION

During filming sequences with a motion picture or video camera, it is often necessary for the camera to be moved over a floor or ground surface. This movement must be accomplished smoothly. Even small amounts of shock or vibration transmitted to the camera lens can result in shaky or erratic recorded images.

One technique for achieving smooth camera movement is to support the camera on a camera cart, dolly or crane which moves or rolls over rails or track. However, installing track is very time consuming. Placement of the track may also interfere with camera angles, since in most filming sequences, it is important that the track must remain out of the field of view of the camera. In addition, after the track is laid, the dolly is necessarily restricted to movement purely along the track. Even small changes to the path of movement of the camera (as may be spontaneously requested by the director, cinematographer, camera operator, etc.) cannot be achieved without changing the track layout. As a result, track is generally only used when absolutely necessary, such as where smooth movement over a very irregular surface (such as sand, gravel, unpaved outdoor surfaces, etc.) is needed.

Due to the need for an extremely stable camera platform, even relatively smoother surfaces, such as paved surfaces, or indoor flooring, can create difficulties in achieving satisfactory filming. The motion picture or video camera is typically mounted on a camera crane or dolly having wheels which roll over the floor or supporting surface. Irregularities in the floor or supporting surface (for example, cracks, bumps, depressions, debris particles, etc.) generate shock and/or vibration impulses which can be transmitted through the structure of the dolly to the camera lens. These impulses degrade steady filming ability. In addition, since the camera is typically positioned substantially above the floor surface, the effects of a small crack or bump in the floor surface can be magnified at the camera position. To reduce the effects of irregularities in the floor surface, camera dollys and cranes having soft tires have been used. However, soft tires cannot eliminate the effects of larger irregularities in the floor surface. In addition, soft tires increase rolling friction, and make the dolly more difficult to move or steer.

The shock and vibration isolator described in Chapman, U.S. Pat. No. 4,989,823, incorporated herein by reference, has successfully been used for several years. This isolator design is very effective in isolating the camera from lateral (side to side) and longitudinal (front to back) shock and vibration impulses. It has been widely used with very good results on camera dollys. However, this isolator design has only limited ability to prevent vertical shock or vibration impulses from reaching the camera.

Accordingly, there is a need for an improved device and system to allow for smooth filming sequences.

Many camera cranes and dollies have a leveling system for keeping the camera platform in a level orientation as the crane or dolly arm pivots up or down. Typically, these leveling systems use a parallelogram linkage, with examples described in Chapman U.S. Pat. Nos. 4,360,187; 5,816,552; 6,345,919 and 6,450,706, incorporated herein by reference.

These parallelogram leveling systems keep the camera platform locally level, that is level or parallel with the vehicle, such as a crane or dolly that they are mounted on (and not necessarily level with the ground). However, when the dolly rolls over an irregularity, such as a bump or crack, the dolly is momentarily inclined at a slight angle. This movement, or elevation angulation, causes the camera lens to also be momentarily inclined at a slight angle. This disturbance of the camera lens can become unacceptable, especially when filming distant subjects with telephoto lenses. Accordingly, there is a need for an improved camera platform leveling system able to better compensate for angulation.

SUMMARY OF THE INVENTION

The invention provides a shock and/or vibration isolating system which effectively reduces physical disturbances to the camera, as the crane, dolly, or other vehicle supporting the camera rolls over an irregular floor or supporting surface. Vibration or shock impulses in each of the vertical, lateral, or longitudinal directions are effectively prevented from significantly disturbing the camera. The present isolator is especially useful on camera cranes where greater ranges of movement, higher rolling speeds, and irregular floor or ground surfaces, such as pavement (having cracks, bumps, expansion joints, etc.) are frequently encountered.

In a first aspect, a camera support has a isolator plate attached to a base and pivotable in a vertical direction. One or more springs aligned at a slight angle to the plate exert a spring force between the base and the plate. The spring force is advantageously adjustable. A dampener element, such as an adjustable viscous shock absorber, exerts a dampening force on the plate. Up and down pivoting movement of the plate effectively prevents shock impulses from disturbing the camera. The camera and the plate remaining largely stationary, due to inertia, while the vehicle carrying the camera support moves up and down over bumps, cracks, or other irregularities in the floor or ground surface.

In a second aspect, a second plate is supported by the first plate and is movable in a lateral direction, and in a longitudinal direction. Springs and optional dampeners advantageously help to prevent lateral and longitudinal impulses from disturbing or reaching a camera attached to the second plate. A leveling system is preferably associated with the first and second plates, to maintain the second plate in a level orientation, as the first plate pivots vertically up and down.

In a third aspect, a camera support or isolator includes a vertical axis system which includes an arm pivotably attached to a base and one or more springs and dampeners connected to the base and arm. A horizontal isolator isolates the camera from horizontal impulses using a pendulum-like dampened movement.

In a fourth and separate aspect, a leveling linkage is adjustable to compensate for angulation caused when the crane or dolly supporting the camera rolls over an irregularity on the ground or floor. Accordingly, with the camera support mounted on a crane or dolly, the elevation angle of the camera lens is better maintained, as the crane or dolly rolls over irregularities in the floor surface. The adjustment feature allows the leveling system to be substantially matched with the wheel base of the camera dolly or crane, to reduce agulation affects.

Other objects, features, and advantages will appear below. The invention resides as well in subcombinations and subsystems of the features, elements, and method steps described. The vertical and horizontal axis isolators can be used alone, or in combination with each other.

It is an object of the invention to provide improved camera supports and isolators.

BRIEF DESCRIPTION OF THE DRAWINGS

In the drawings, wherein the same reference number indicates the same element in each of the views:

FIG. 5 is a side view of the camera support shown in FIGS. 2–4, with the camera support shown in a downward orientation, before tensioning of the springs.

FIG. 6 is a side view of the camera support shown in FIG. 5, with the spring and turnbuckle removed, to illustrate the dampener.

DETAILED DESCRIPTION OF THE DRAWINGS

Figure 1:
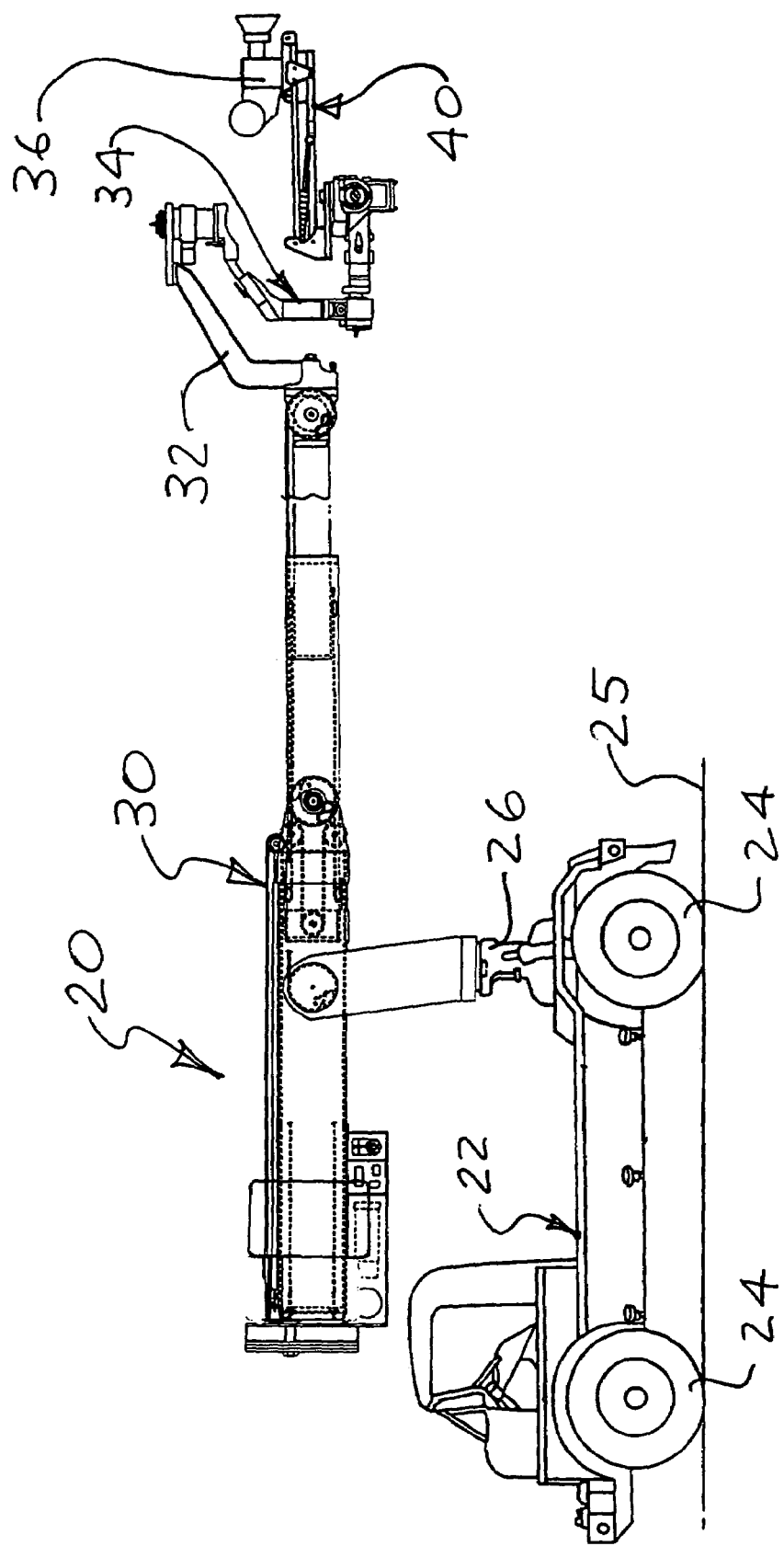
FIG. 1 is a side view of the present camera support or isolator used on a camera crane.
Figure 2:
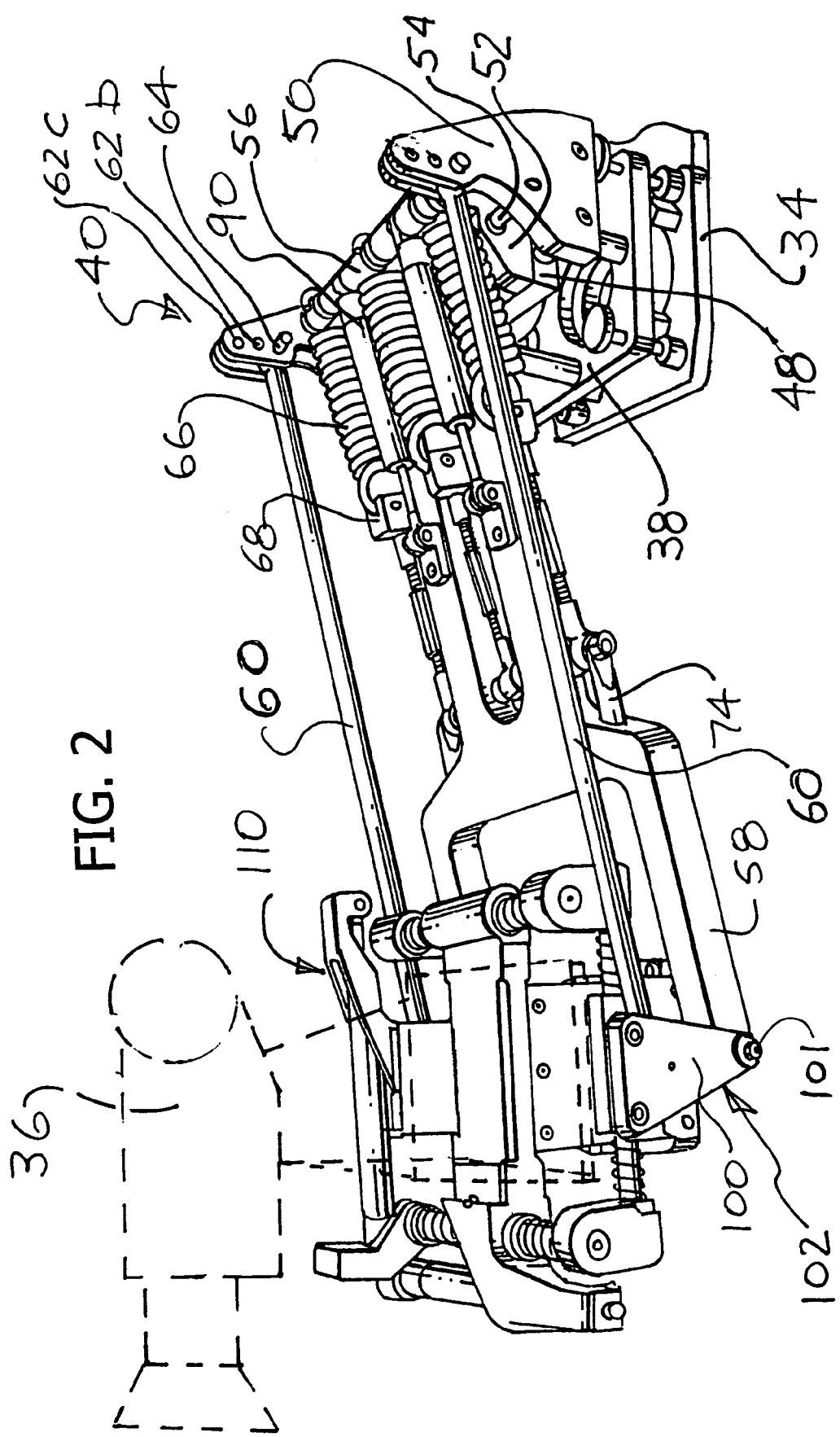
FIG. 2 is a top and left side perspective view of the camera support shown in FIG. 1, with the camera shown in dotted lines, and with one of the lateral dampeners, and one of the longitudinal dampeners removed, for purpose of illustration.
Figure 3:
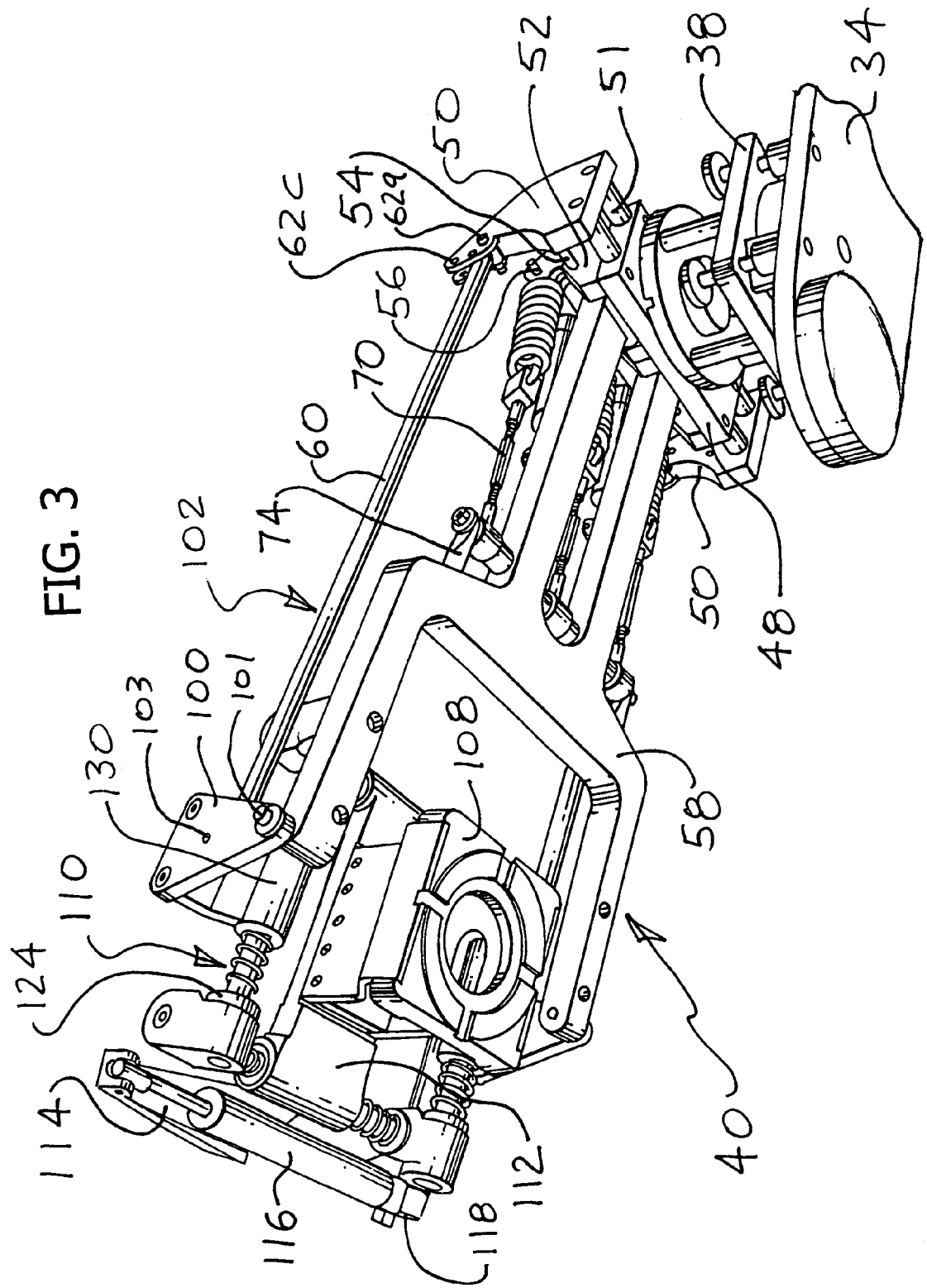
FIG. 3 is a bottom, front, and left side view of the camera support shown in FIG. 2, and with one of the lateral dampeners, and one of the longitudinal dampeners removed, for purpose of illustration.

As shown in FIG. 1, a camera crane 20 has an arm 30 mounted on a mobile vehicle or platform 22 which rolls on wheels 24. The arm 30 is pivotably mounted on a post 26, to allow the arm 30 to move in a panning (azimuth) direction. For typical filming sequences, a nose 32 and a remote movement head 34 may be provided on the arm 30. Referring to FIGS. 1–3, the present shock and vibration isolator or support 40, in the example shown, is supported on an optional leveling head 38 attached to the remote movement head 34. The camera 36 is attached to the front end of the isolator 40, as shown in FIGS. 1 and 2. The arm 30, shown in FIG. 1, may be a fixed length arm (assembled from separate segments) or it may be a telescoping arm, for example, as described in U.S. patent application Ser. No. 10/791,118, incorporated herein by reference. The remote head 34, if used, may be a two or three axis head, as described, for example, in U.S. patent application Ser. No. 10/782,034, incorporated herein by reference. Of course, FIG. 1 shows but a single example of use of the isolator 40 on a crane. The isolator 40 may also be used on camera dollys or other mobile platforms or vehicles with, or without, use of a post 26, arm 30, nose 32, or remote head 34. As shown in FIG. 3, a drop down attachment may be attached to the bottom surface of the mounting plate 112, to mount the camera in an underhand position below the isolator plate 58.

Figure 4:
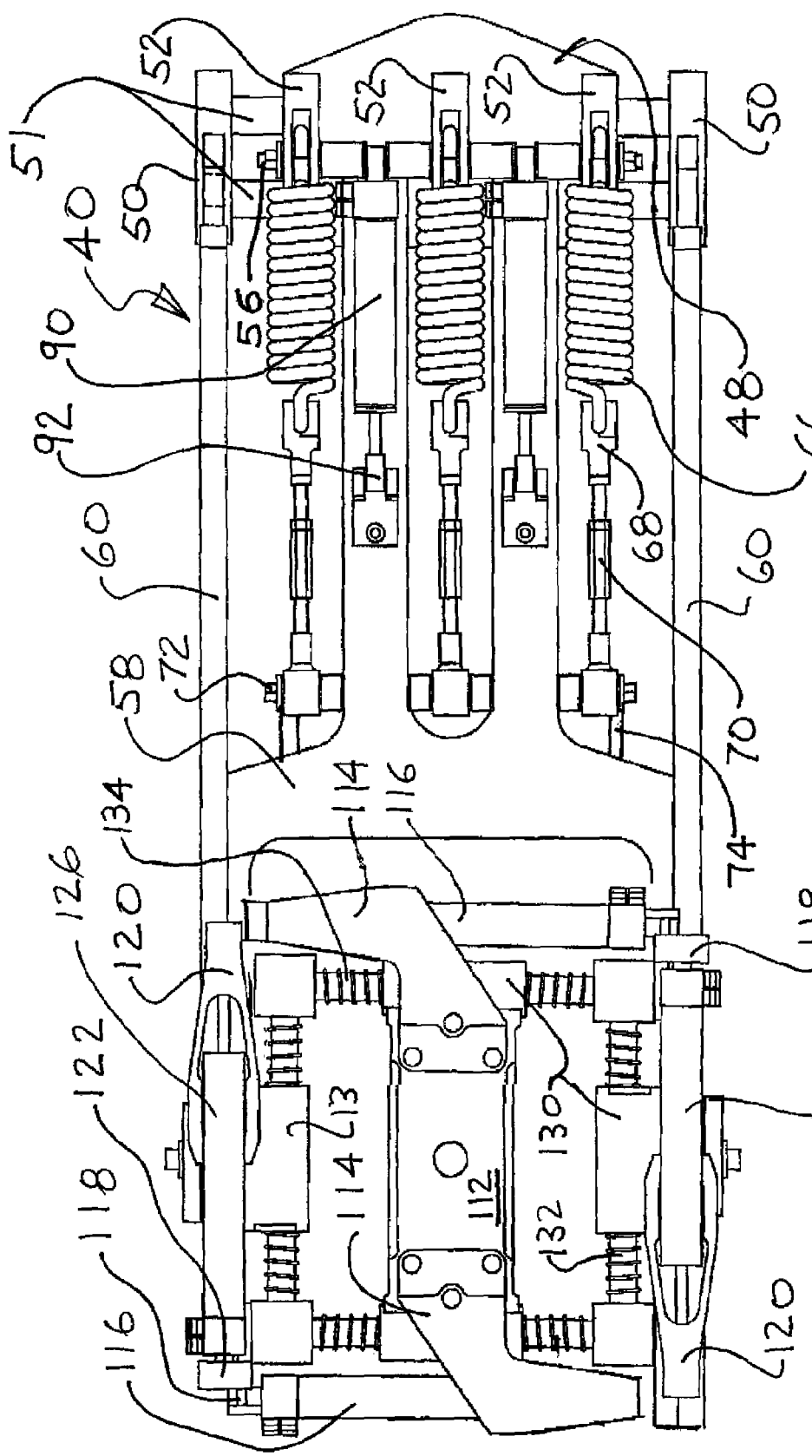
FIG. 4 is a plan view of the camera support shown in FIGS. 2 and 3.

Turning now to FIGS. 2, 3, and 4, the isolator 40 has left and right, or first and second side plates 50 attached to a base 48 by side plate posts 51. The base 48 collectively includes the components of the isolator 40 which are rigidly attached to and move with the crane or dolly arm, or other supporting structure. First and second, or left and right axle plates 52 are attached to the base 48, between the side plates 50. An isolator arm 58 is pivotably attached to plate 48 via an axle 54 extending through the axle plates 52 and holes in the back end of the isolator arm 58. The isolator arm 58 can therefore pivot vertically, or up and down, about the axle 54. A spring bar 56 extends through and is supported by the axle plates 52.

Referring to FIGS. 2 and 3, first and second, or left and right leveling plates 100 are pivotably attached to the front end of the isolator arm 58. A leveling rod 60 is pivotably attached to each leveling plate 100, at the front end of the isolator 40, and is also pivotably attached to a side plate 50, at the back end of the isolator 40. As best shown in FIG. 2, three (or more) holes or openings 62a, 62b and 62c are provided at the top of each side plate 50. The back end of the leveling rod 60 is attached to the side plate 50 at one of the holes 62a–c, using a quick release pin 64. The holes 62a, 62b, and 62c are located on a diameter centered at the pivot joint 103 where the front end of the levelling rods pivotably attach to the levelling plates. These holes are at a position slightly forward of the axle 54. The leveling rods 60 attach to the upper pivot joint 103 on the leveling plates at a location also slightly forward of the lower pivot joint 101 where the isolator plate is attached to the leveling plates 100.

Figure 9:
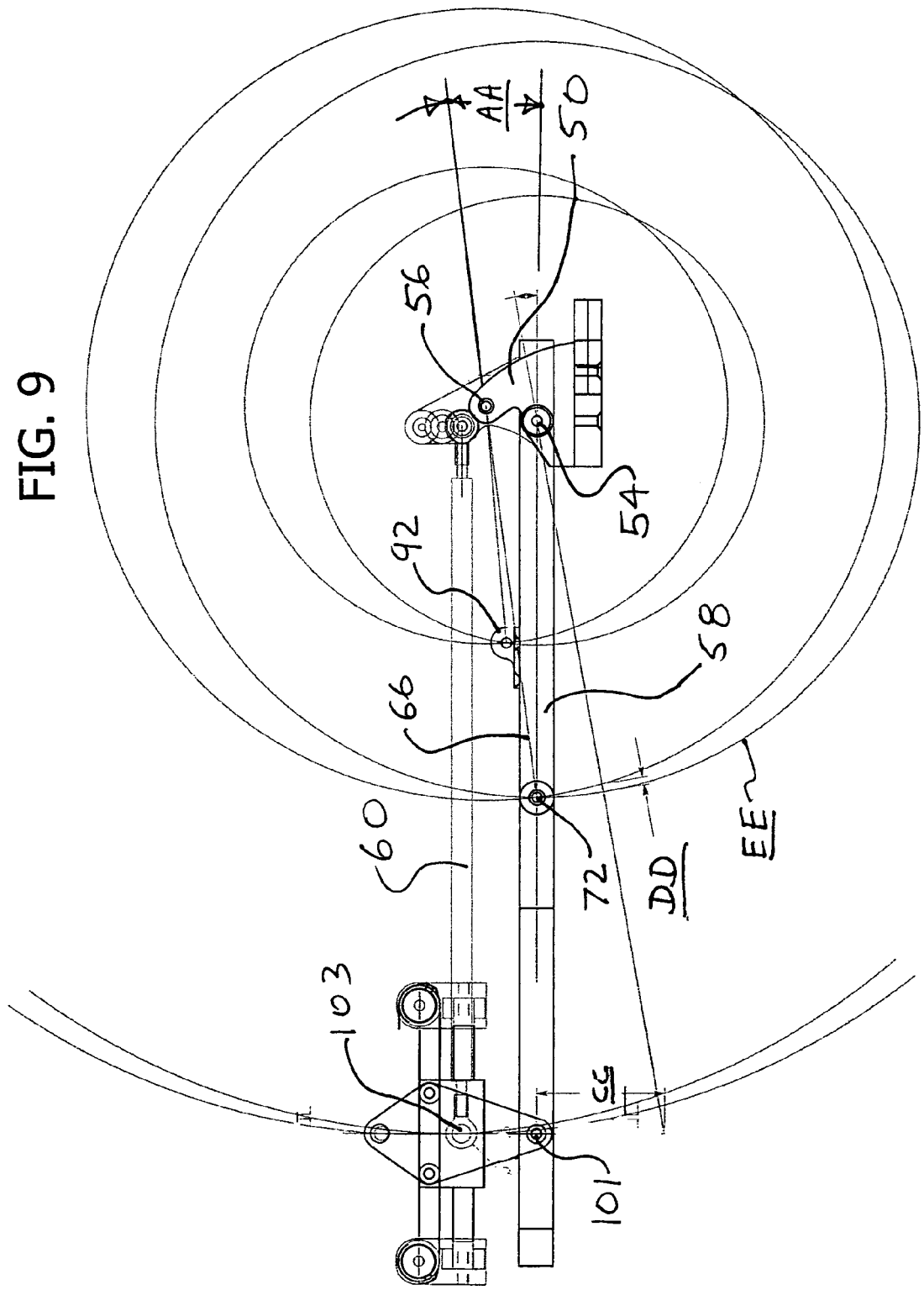
FIG. 9 is a schematic diagram showing operation of the isolator shown in FIGS. 2–8.

As shown in FIGS. 2 and 4, springs 66 are provided to exert a tension spring force on the isolator arm 58. Each spring 66 extends from the spring bar 56, which is rigidly connected to the base or base plate 48, to a turnbuckle 70 attached to a spring axle 72 on the isolator arm 58. A spring cap 68 is used to connect the front end of the spring 66 to the back end of the turnbuckle 70, as shown in FIGS. 2 and 4. Referring momentarily to FIG. 9, the spring bar 56 is vertically above the plate axle 54 and the spring axle 72, as shown in FIG. 4. Accordingly, the tension force exerted by the springs 66 acts at an angle AA to the plane of the isolator arm 58. The angle AA preferably ranges from 2–20, 5–15, or 8–12 degrees. This allows for relatively large amounts of pivoting movement of the isolator arm 58, with relatively little deflection of the springs 66, resulting in an elastic or soft feel or movement of the isolator arm 58.

On the other hand, since the angle AA is small, the vertical component of force exerted by the springs 66 is also small. In the design shown, three springs are used to achieve sufficient vertical force on the isolator arm 58. As one example, to support a camera payload of about 100 pounds, three springs 66 are used, with each spring having a spring constant of about 600 pounds/inch. The number and type of spring or springs selected will vary with the intended payload and other parameters.

Figure 8:
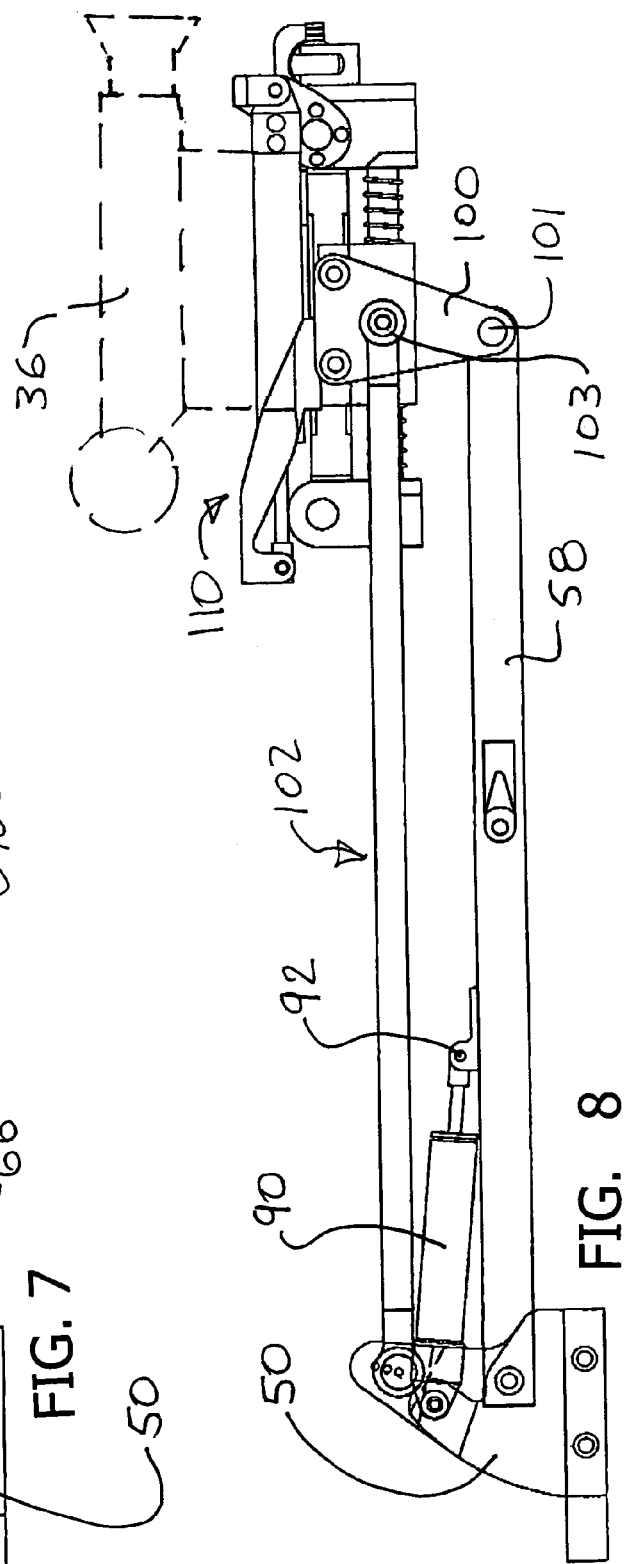
FIG. 8 is a side view of the isolator, as shown in FIG. 7, with the spring and turnbuckle removed for purpose of illustration.

Spring axle end supports 74 may be provided, as shown in FIGS. 3 and 4, to better support the spring axles 74. Referring still to FIGS. 2 and 4, the back end, or cylinder of a dampening element is attached to the spring bar 54. The piston or front end of the dampening element 90 is attached to a clevis 92. shown in FIG. 8, on the isolator arm 58. Referring to FIGS. 8 and 9, the dampener 90 exerts a dampening force on the isolator arm 58, along an axis or line slightly offset from the spring force direction. The dampeners 90 are preferable viscous or fluid dampeners, with adjustable dampening characteristics. While two dampeners 90 are shown, one or more may be used, and different types of dampening elements may be used. In an alternative design, compression springs can optionally be used instead of, or in addition to, the tension springs 66, with the compression springs attached to a spring bar mounted below the axle 52.

Referring to FIGS. 2–4, a horizontal or X-Y isolator subassembly or subsystem 110 is supported at the front end of the isolator arm 58. The horizontal isolator assembly 110 is similar to the isolator described in U.S. Pat. No. 4,989, 823, incorporated herein by reference. However, the horizontal isolator assembly 110 further includes dampening elements. Referring to FIG. 4, lateral shock or dampening arms 114 are attached to the mounting plate 112. A lateral shock absorber or dampener 116 is connected between each arm 114 and a fixed connection point 118, located at diagonally opposite corners of the assembly 110. Referring still to FIG. 4, a ferrule or guide bar housing 130 is attached to each leveling plate 100. The ferrule 130 is slidably positioned around the longitudinal guide bars 132. Longitudinal dampener or shock absorber arms 120 are attached to the left and right side ferrules 130 or leveling plate 100, and to fixed connection points 122, located at diagonally opposite corners of the assembly 110. End cushions 124 are also provided adjacent to the ends of the longitudinal guide bars 132 and to the lateral guide bars 134. Centering compression springs 136 act to maintain the mounting plate 112 in a central position as described in U.S. Pat. No. 4,989,823.

Figure 7:
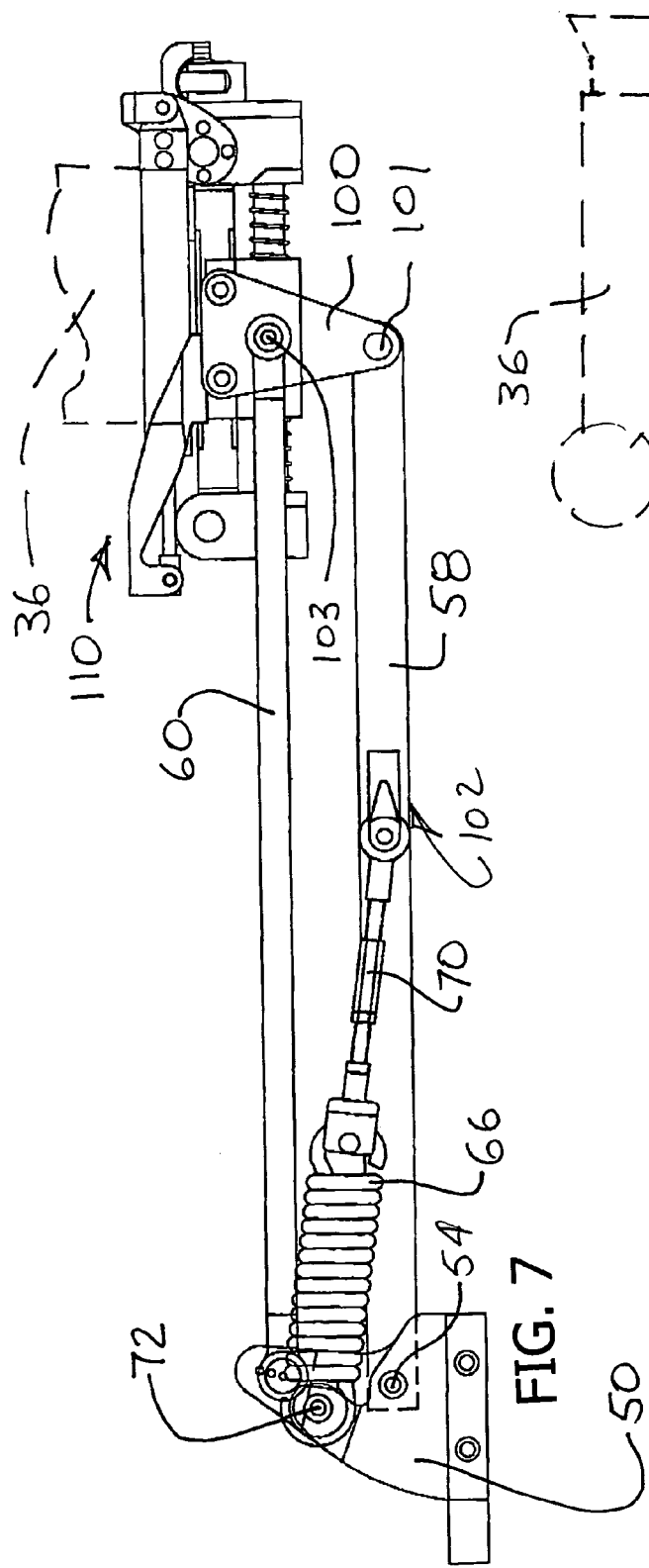
FIG. 7 is a side view of the isolator, as shown in FIG. 5, with the isolator now in a level position after tensioning of the springs.

Referring to FIGS. 7–9, a parallelogram linkage 102 is formed by the leveling rod 60, isolator arm 58, leveling plate 100, and the base (which here includes the side plates 50, axle plates 52, axle 54, and the quick release pins 64). As shown by comparing the isolator 40 as shown in FIGS. 5 and 6, with the isolator 40 as shown in FIGS. 7 and 8, as the parallelogram linkage 102 pivots up or down about the base, the leveling plates 100 remain at the same level orientation. Since the ferrules 130 on the leveling plates 100 support the horizontal isolator assembly 110, the horizontal isolator assembly 110 also remains level as the isolator 40 pivots up or down.

In use, the isolator 40 is attached to a remote head 34, or to another crane or dolly accessory, such as a leveling head 38, riser, drop down, swing head, etc. Alternatively, the isolator 40 can be attached directly to a crane or dolly arm, such as the crane arm 30 shown in FIG. 1, or the dolly arm 152 on the dolly 150, shown in FIG. 10. The weight of the camera 36 can vary widely. For example, a compact digital camera and camera accessories may weigh as little as e.g., 20 or 30 pounds while a conventional motion picture film camera, along with its lens and film magazine, batteries, etc. may weigh e.g., 130 pounds. The isolator is therefore advantageously made so that it can be adjusted depending upon the weight of the camera 36.

Referring to FIGS. 5 and 6, while the springs 66 typically have an initial tension (e.g., 150–550, 250–450, or 300–400 pounds), when the camera 36 is initially placed on the mounting plate 112 of the isolator 40, the isolator deflects downwardly, as shown in FIGS. 5 and 6. The turnbuckles 70 are then tightened. This stretches the spring 66 attached to the turnbuckle 70, increasing the spring force, including the vertical component of the spring force, acting on the isolator arm 58. As the turnbuckles 70 are tightened, the isolator arm 58 pivots upwardly from the downwardly inclined position shown in FIGS. 5 and 6, to the level or horizontal position shown in FIGS. 7 and 8. The turnbuckles 70 may be turned using a wrench. Alternatively, they may be provided with hand levers, or similar devices, which allow tightening, or loosening, by hand, so that no tools are required during set up.

Figure 10:
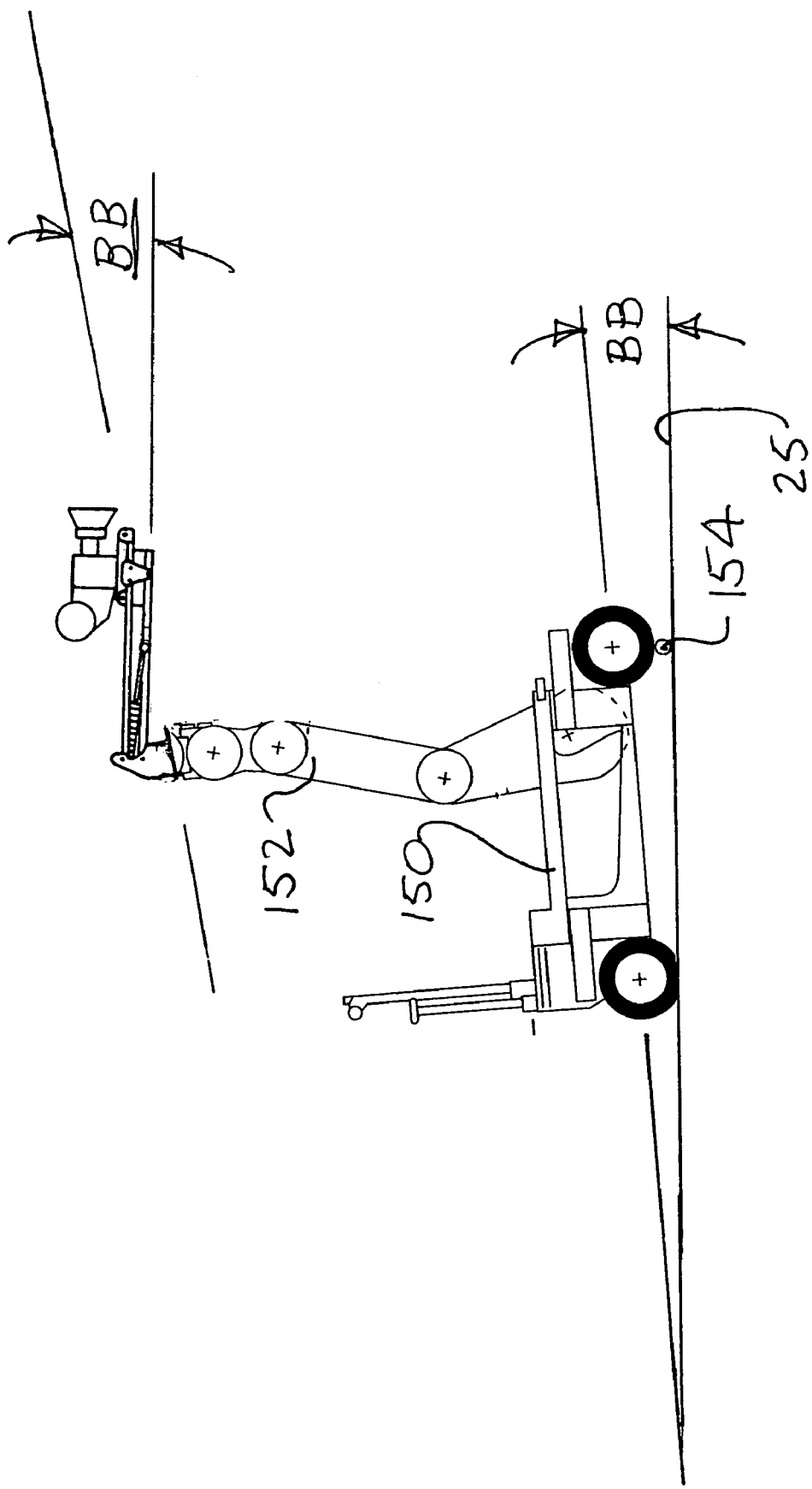
FIG. 10 is a schematic diagram showing reduction of angulation.

The dampeners 90 are adjusted to provide a desired dampening characteristic for movement of the isolator arm 58. As the crane 22, shown in FIG. 1, or the dolly 150, as shown in FIG. 10, rolls over the ground or floor 25, the crane vehicle 22 and arm 30 (or the dolly 150 and dolly arm 152) necessarily move up and/or down vertically, as the wheels roll over irregularities or uneven ground. While the shock and vibration impulses created by rolling over irregularities move through the supporting structure (22 and 30, or 150 and 152) to the base 48, the mounting plate 112 and camera 36 remain largely steady and unaffected. Due to inertia, the camera 36 remains substantially in a fixed position, with the isolator arm 58 pivoting up and down, as driven by the supporting structure 30 or 152.

As the spring force is primarily horizontal, and with only a small vertical component, the isolator arm 58 can achieve a range of travel of about plus or minus 4–10, 5–9, or 6–8 inches (for a total vertical range of travel of 12–16 inches), yet while stretching the springs 66 by only a small amount. For example, as shown in FIG. 9, with the isolator arm 58 moving down vertically by about 4.7 inches (as measured by the pin or bolt 101 attaching the leveling plate 100 to the front end of the isolator arm 58), the springs 66 stretch by a distance DD of about 0.3 inches. As the isolator arm 58 moves down, the spring axles 72 move along diameter EE centered at the axle 54. As the springs 66 are attached to the spring bar 56, offset vertically above, and slightly behind the axle 54, downward movement of the isolator arm 58 causes the springs 66 to stretch. Conversely, upward movement of the isolator arm 58 allows the springs to contract.

Figure 11:
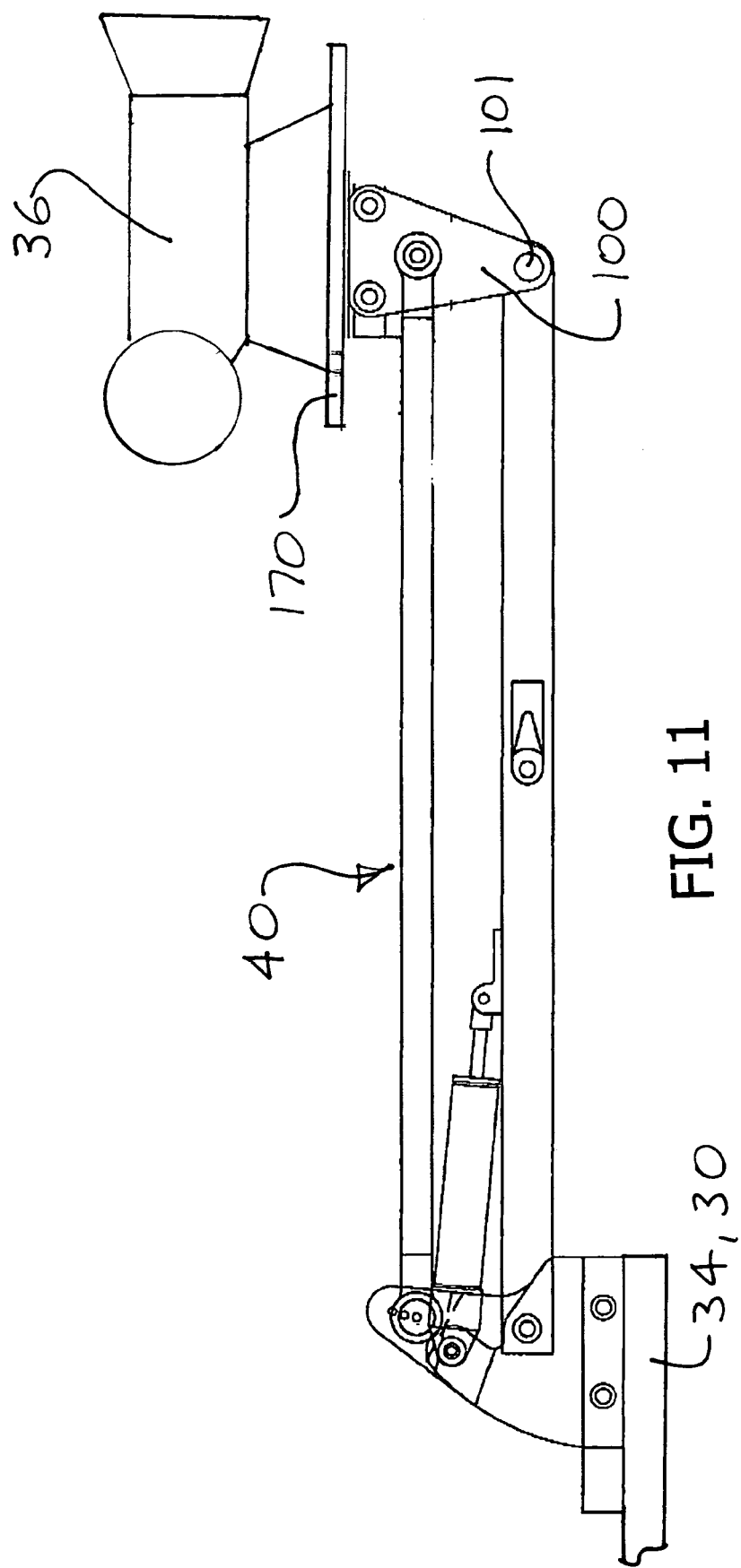
FIG. 11 is side view of the isolator shown in FIGS. 2–8 in use without the horizontal isolator assembly.

As shown in FIG. 11, the isolator 40 may be used without the horizontal isolator assembly. In this use, a camera mounting plate 170 is directly and rigidly attached to the leveling plates 100, and the camera is mounted on the mounting plate 170. This provides for vertical isolation of the camera.

The horizontal isolator assembly 110, if used, isolates the camera 36 mounted on the mounting plate 112 from longitudinal and lateral shock and vibration impulses, similar to as described in U.S. Pat. No. 4,989,823. In addition, the dampening elements 116 and 126 dampen lateral and longitudinal movement. The dampening elements are arranged in pairs, with each pair acting together, to avoid torquing the mounting plate 112, as the springs act to return the mounting plate to the center position, after a deflection caused by a shock impulse from the base.

As described in U.S. Pat. No. 4,989,823, the lateral guidebars 134 have a radius of curvature. As described therein, for use with larger dollys or cranes, the radius of curvature of the lateral guidebars 134 is larger. Accordingly, for use on a small camera dolly, as shown in FIG. 10, the radius of curvature of the lateral guidebars 134 may be e.g., 36–144 inches. For use on a larger vehicle, such as the crane shown in FIG. 1 where the camera 36 is ordinarily at a higher elevation above the ground, the radius of curvature of the lateral guidebars 132 will be greater (meaning that the bars will have less curvature), for example, in the range of 60–168 inches.

Referring to FIGS. 2 and 10, the adjustment positions 62a, 62b and 62c of the leveling rods 60 can be used to change the characteristics of the parallelogram linkage 102, to compensate for elevation angulation. As shown in FIG. 10, when the front wheel of a mobile vehicle, such as a camera dolly 150 rolls over a bump, crack, cable, or other irregularity 154, the front end of the dolly 150 necessarily rises up, as the wheel rolls over the irregularity. Consequently, the entire dolly 150, arm 152, and base 48 of the isolator 40 are also moved into an incline position, at an angle BB in FIG. 10. The angle BB in FIG. 10 is exaggerated for purpose of illustration. In actual use, the inclination angle BB would be much smaller and less noticeable.

Since the parallelogram linkage 102 ordinarily maintains the mounting plate 112 level with the base 48, the mounting plate and camera 38 are ordinarily inclined upwardly at angle BB, due to the angulation caused by the irregularity 154 on the floor 25. As a result, the elevation angle of the camera lens is higher than intended, and higher than when the dolly 50 is level. While the angulation may be acceptable in some filming sequences, in others, especially where telephoto lenses are used to film subjects at a great distance, this angulation may be disadvantageous or unacceptable. The alternate connection locations 62a, 62b, and 62c for the leveling rods 60 allow the isolator 40 to compensate for elevation angulation. As shown in FIGS. 5 and 6, with the leveling rods 60 connected to the side plates 50 at the center or bottom locations 62a or 62b, the leveling rod 60 is no longer precisely parallel to the isolator plate 58. Consequently, as the now slightly non-parallel linkage 102 pivots down and up, the camera mounting plate will pivot clockwise and counterclockwise, respectively, by a proportional amount. With this setup, the camera mounting plate is level with the base only when the linkage 102 is horizontal. When the dolly 150 rolls over an irregularity creating elevation angulation, the downward pivoting movement of the isolator arm 58 results in the parallelogram linkage 102 pivoting the mounting plate 112 and the camera 36 slightly downwardly, or clockwise in FIGS. 5 and 6. The lens of the camera 36 accordingly remains generally aimed at the subject. Without the compensation provided by the angulation adjusting features 62c, the lens would be aimed to high.

After the dolly 150 rolls over the irregularity and returns to a level position, the base also returns to a level position, as shown in FIGS. 7 and 8, along with the isolator arm 58. The linkage 102 similarly returns to its centered or neutral position, wherein the mounting plate 112 and camera 36 are level. The reverse angulation compensating effect occurs when the front wheels of the dolly 150 roll into a recess or depression, or the rear wheels encounter a bump, and the isolator arm 58 moves into an upwardly angled position.

With the isolator arm 58 angled upwardly, the linkage 102, when set up as shown in FIGS. 5 and 6, tilts the mounting plate 112 and the camera 36 slightly upwardly, or counterclockwise in FIGS. 5 and 6, to better maintain aim of the lens. As is apparent from FIG. 10, the shorter the wheel base of the crane or dolly, the more elevation angle will occur as the dolly rolls over an irregularity. The angulation compensation feature of the linkage 102 is therefore especially useful with small camera dollys.

While the parallelogram adjustment or compensation features are shown as the holes 62a, 62b, and 62c having different vertical positions on the side plates 50, the same compensating effect can be achieved by similar holes on the leveling plates 100, or by changing the pivot joint locations of the isolator plate 58 to create a non-parallel or near-parallel linkage. In the specific design shown, where the spacing between the axle 54 and the leveling plate lower pivot joint 101 is about 26 inches, the holes 62a, 62b and 62c are preferably spaced vertically apart by 0.3–0.7 or 0.8, 0.4–0.6 or about 0.5 inches. Alternatively, the elements forming the longer sides of the near parallelogram, here the leveling rods and the isolator plate 58, are offset so that they form an angle of 2–7, 3–6 or about 4 or 5 degrees with each other.

In general, the selection of the top, center, or lower holes 62c, 62b, or 62a will be determined on whether elevation angulation is desired. If no elevation angulation compensation is wanted, the top hole 62c is used, as this provides a pure parallelogram linkage. If elevation angulation compensation is desired, the second or center hole 62b is preferably used when the mobile vehicle has a larger wheel base (typically about 150 or 200 cm or greater). The bottom hole 62a is preferably used when the vehicle has a shorter wheel base, to provide increased compensation for the increased angulation occurring with vehicles or dollys having a shorter wheel base (typically about 80 to 120 or 150 cm, or less). Of course, additional holes, or overlapping notches, may also be provided, to provide various degrees of angulation compensation. While the use of quick release pins and the holes 62a–c are shown, other equivalent techniques or means for changing the positions of the levelling rods may also be used, including clamping fittings, cams, screw threads, latches, etc. The levelling rods may also include means for varying their length, such as screw threads, turnbuckles, telescoping arrangements, etc., to vary the initial camera position set up, as well as the compensation characteristics of the isolator.

Figure 13:
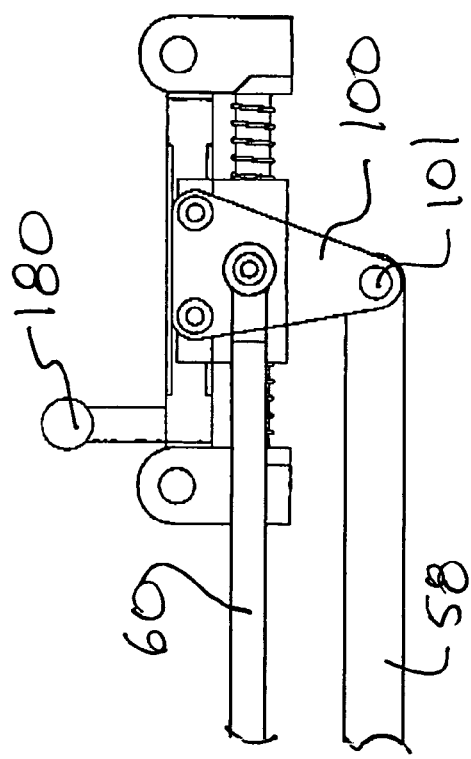
FIG. 13 is side view of the alternative horizontal isolator assembly shown in FIG. 12.
Figure 12:
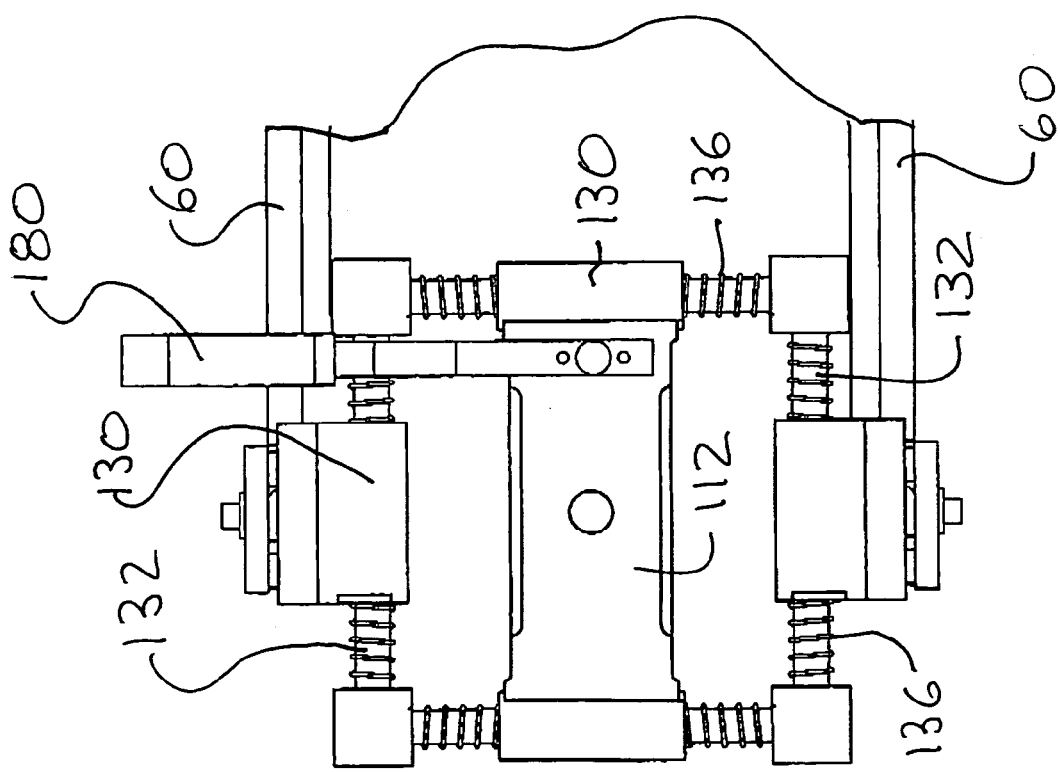
FIG. 12 is a plan view of an alternative horizontal isolator assembly design.

Turning to FIGS. 12 and 13, in an alternate design of the horizontal isolator assembly, the pairs of dampening elements 116 and 126 are removed. No dampening elements are used. A handle 180 attached to the mounting plate 112 extends out to one side. The springs 136 are provided with a spring constant which is just sufficient to overcome friction and to slowly return the mounting plate to the center position. Dampening, if desired, if provided manually, by holding the handle 180, and optionally pushing or pulling the mounting plate back to the center position, after a deflection away from the center position.

Figure 14:
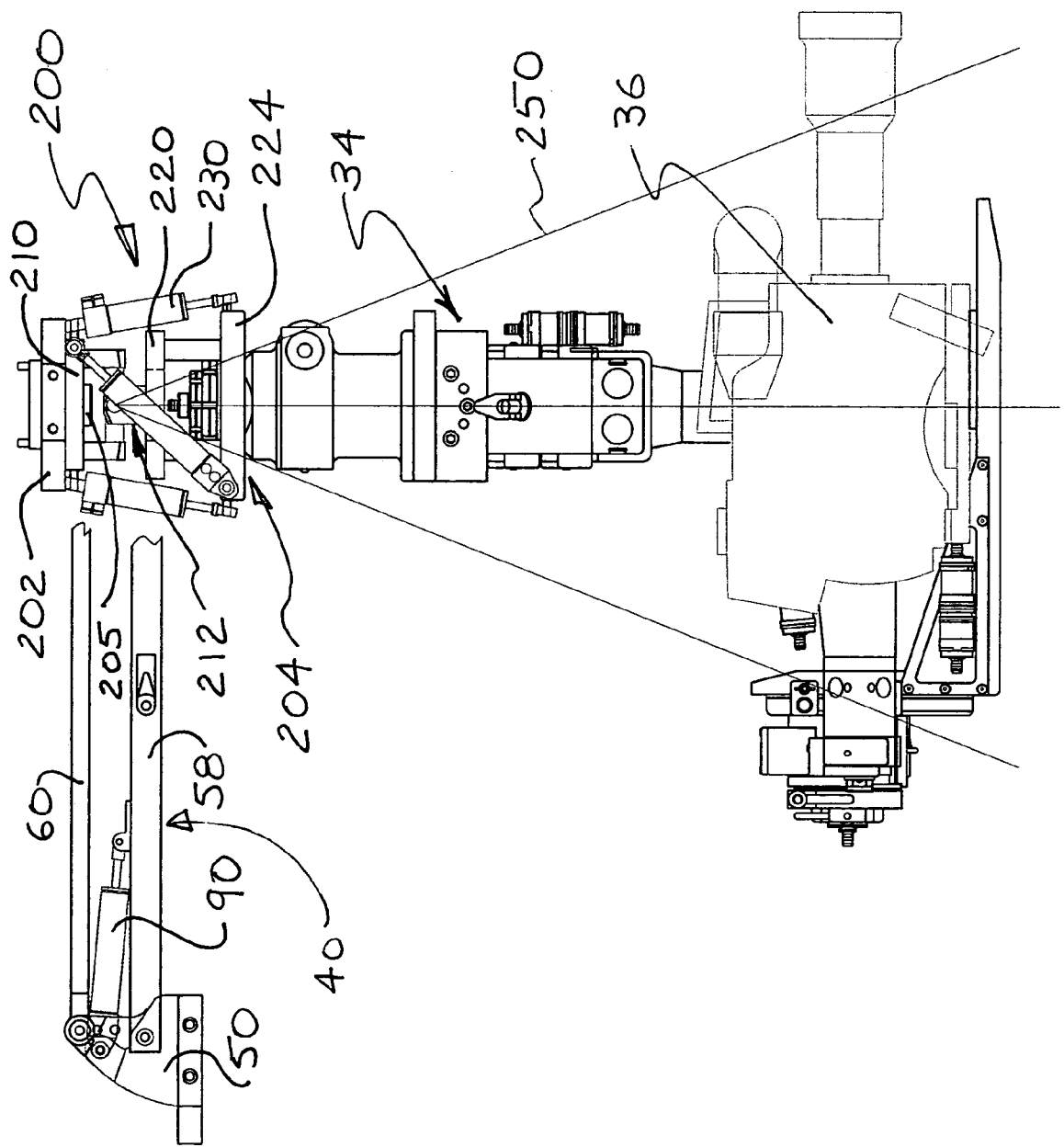
FIG. 14 is a side view of an alternative assembly for isolating a camera from horizontal shock and vibration impulses.
Figure 15:
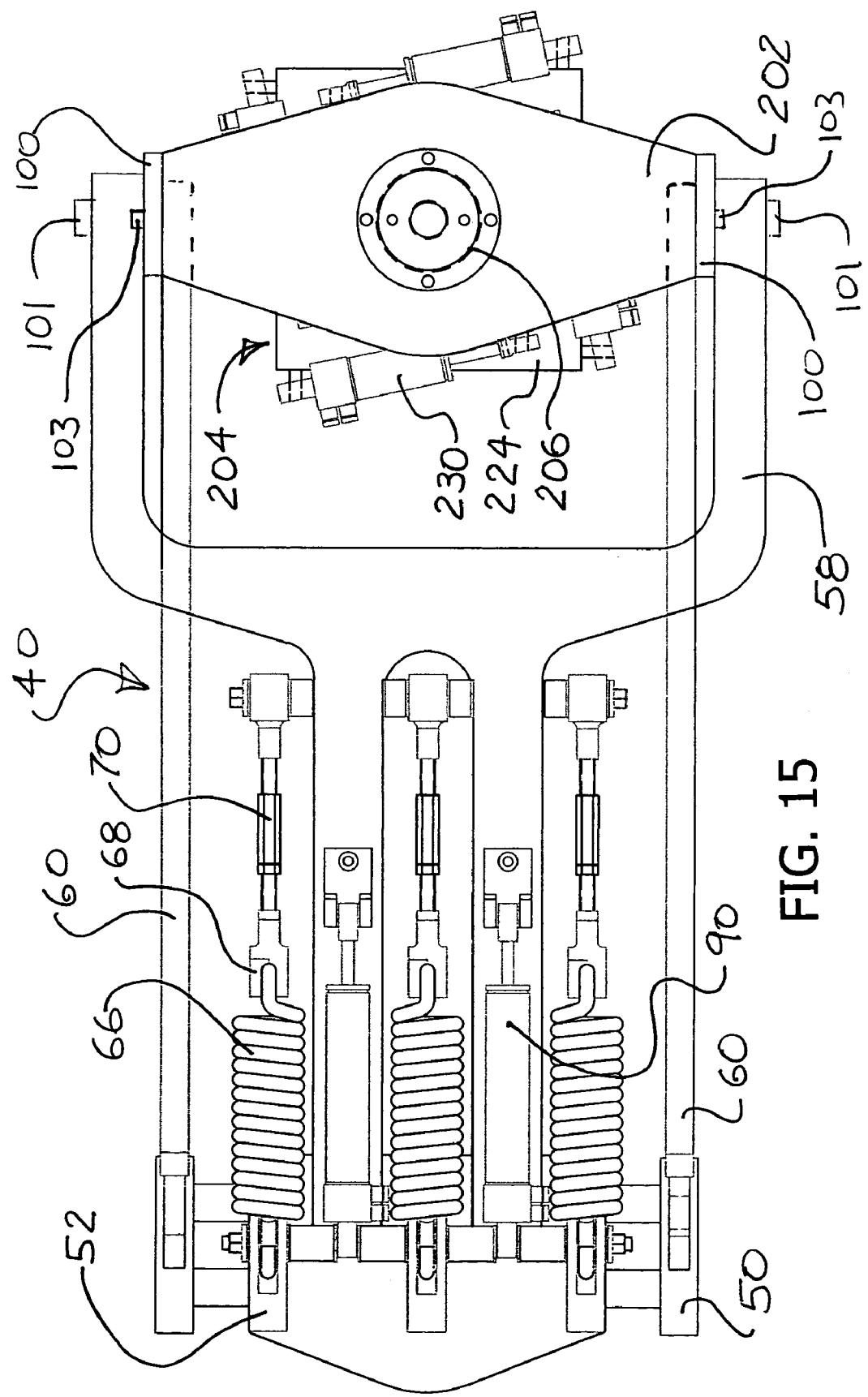
FIG. 15 is a top view of the assembly shown in FIG. 14, with the camera and head removed for purpose of illustration.
Figure 17:
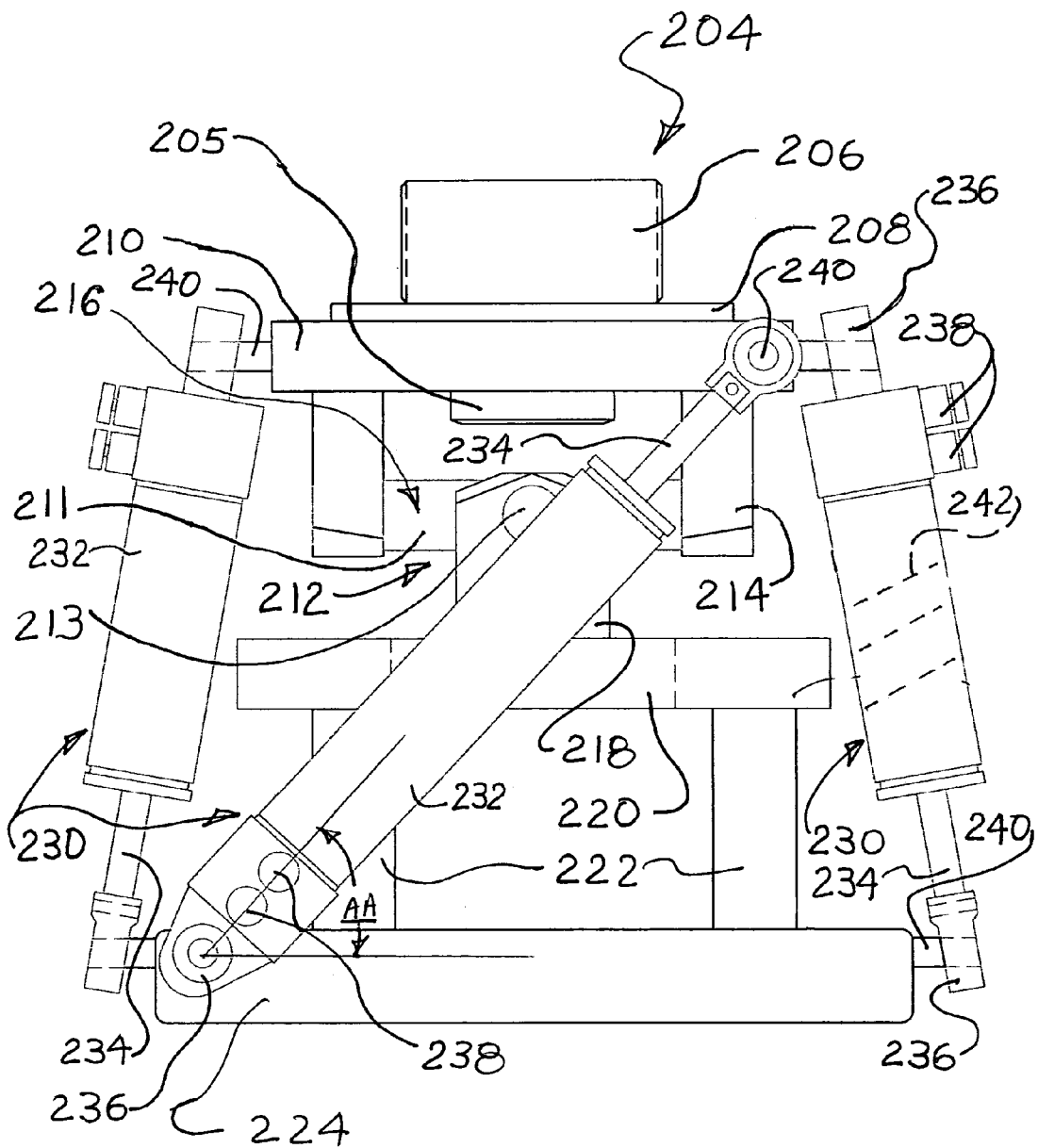
FIG. 17 is a side view of the assembly shown in FIG. 16.
Figure 18:
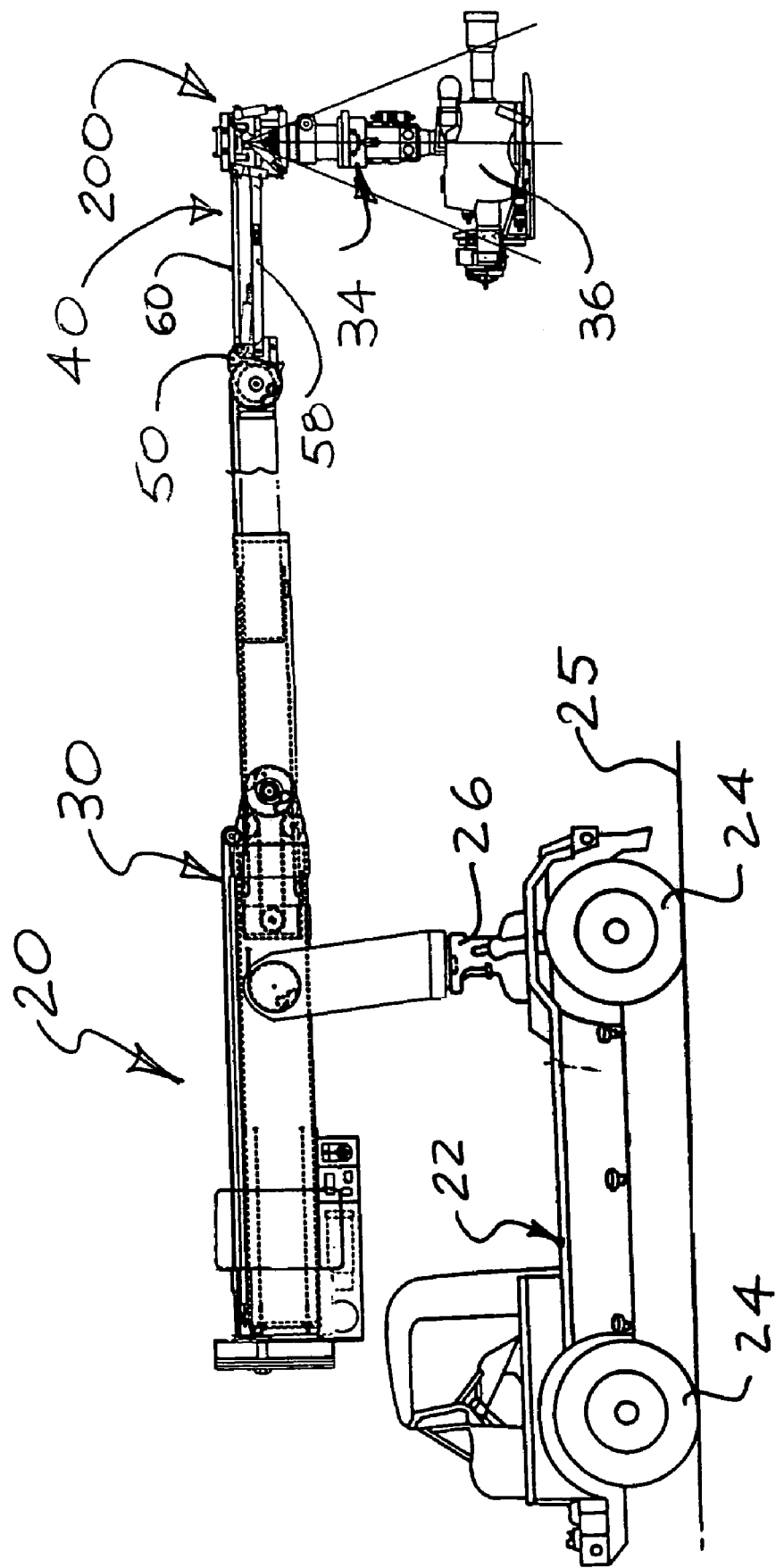
FIG. 18 is a side view of the assembly shown in FIGS. 14–17 as mounted on the mobile camera crane shown in FIG. 1.

Turning to FIGS. 14, 15, and 18, in an alternate embodiment 200, the horizontal isolator 110 (shown in FIGS. 2–8 and 12) is replaced with an overhead isolator or assembly 204. As shown in FIG. 15, a head plate 202 is pivotably attached to the arm 58, in place of the isolator 110. The vertical axis isolator 40 shown in FIGS. 14, 15 and 18 is the same as in FIGS. 2–11, except that the horizontal axes isolator 110 is replaced with the head plate 202. Consequently, the head plate is isolated from vertical shock impulses, and is maintained level, via operation of the isolator 40, as described above. The overhead assembly 204 is attached to the head plate 202 by a mounting hub 206 threaded into a central opening in the plate 202. A hub bolt 205 extends through a top plate 210 of the assembly 204 and is threaded into an opening in the mounting hub 206, as shown in FIG. 17. A bearing disk or washer 208 is positioned between the bottom surface of the mounting hub 206 and the top plate 210.

As shown in FIG. 17, upper posts 214 extend down from the top plate 210 to a first axle 211 of a pivot or U-joint 212. Lower posts 218 extend up from a center plate 220 to a second axle 213 of the pivot joint 212. The ends of the axles 211 and 213 are supported or secured in bearing surfaces on the posts 214 and 218. As a result, the center plate 220 can pivot continuously in two axes (a first axis co-linear with the first axle 211 and a second axis co-linear with the second axle 213). A lower plate 224 is attached to standoffs 222 extending down from the center plate 220. The pivot joint 212 need not necessarily include a u-joint. A ball joint, or other joint allowing pivoting movement in two axes may be used. Indeed, the pivot joint may be virtually any joint or attachment which can hold or support the weight of the center and lower plates 220 and 224, and the payload, while allowing them to pivot or swing relative to the upper plate 210. These other joints then include, for example, a simple chain, cable, or mechanical linkage. In addition, two (or more) separate or combined single axis pivot joints or devices may be used. While the plates 210 and 224 are shown as square, and the plate 220 is shown as round, other shapes (round, polygon, etc.) may be used. The plates may be formed a hollow or open frame structures, with the term plate including such structures, and other supporting structures.

Figure 16:
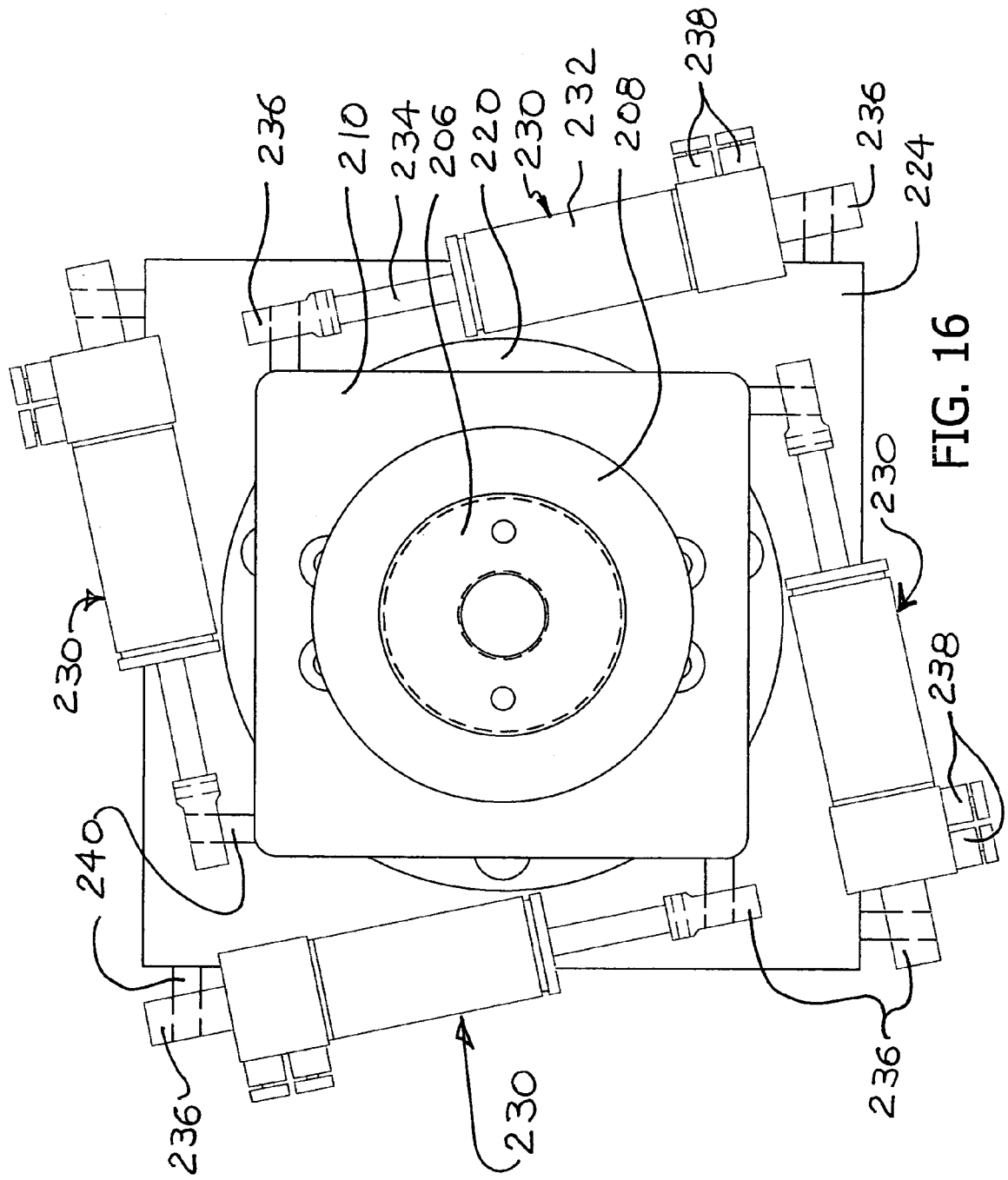
FIG. 16 is an enlarged top view of the assembly shown in FIG. 15, with the head plate removed for purpose of illustration.

Referring to FIGS. 16 and 17, four dampeners or shock absorbers 230 are attached to the top plate 210 and the lower plate 224. While fewer dampeners may be used, the design shown in the drawings uses four. The dampeners are oriented at an angle AA from vertical of about 30–60°, 35–55°, or 40–50°, with the angle AA often near 45°. The precise angle M is not critical. The ranges of angles described here are selected because they generally provide for adequate range of travel. Each dampener 230 has a piston rod 234 which moves in and out from a cylinder 232. Adjusting valves 238 allow for adjustment of the dampening characteristics of the dampener 230. The dampener 230 is preferably a fluid containing viscous dampener or shock absorber, although other types of dampeners may also be used.

Mounting fittings attach opposite ends of each dampener 230 to the top or upper plate 210 and to the lower plate 224. In the design shown, ball joints 236 are used, and are attached to mounting studs or posts projecting out adjacent to each corner of the upper and lower plates 210 and 224. As shown in FIG. 16, the cylinders 232 are pivotably attached to the lower plate 224 and the outer or upper ends of the piston rods 234 are pivotably attached to the upper plate 210. The design shown is symmetrical side-to-side and front-to-back. Springs or other elastic elements 242 (external or combined into or with the dampeners) may also optionally be used to exert return forces, in specific applications.

As shown in FIG. 14, a camera head 34 is attached to (and suspended down from) the lower plate 224. Alternatively, a simple drop down accessory or plate may be used instead of the camera head 34. Since the lower plate 224 is attached to the upper plate 210 through the u-joint 212, the camera head 34 can pivot or swing within the cone-shaped space 250 shown in FIG. 14. The assembly 204 may be provided alone as an accessory for use on various camera cranes and camera dollies. Alternatively, the assembly 204 may also be provided as part of the shock/vibration isolator 40.

In a typical use as shown in FIGS. 14 and 18, the assembly 204 is attached to a head plate 202 of an isolator 40 supported on a crane 20, (although the assembly may equivalently be attached to other supporting structures as well). A camera head, such as head 34 is then attached to the lower plate 224. Alternatively, if no head is used, the camera 36 may optionally be attached to the lower plate, directly, or via an intermediate mounting accessory.

The dampening characteristics of the dampeners 230 are optionally adjusted using the valves or adjusters 238. These adjustments, if performed, may be made based on one or more of the weight of the camera, expected camera movements, and expected shock or vibration. The camera payload (including camera accessories also supported by the assembly 204, such as batteries, cables, remote control units, etc.) is balanced, so that lower plate 224 is level.

The crane 20 maneuvers the camera 36 during filming. The entire crane may accelerate or turn, stop, roll over uneven ground, etc. The crane arm 30 may be accelerated up or down in elevation, or side to side (panning), or may telescope in or out. Consequently, the head plate 202, which is rigidly attached to the crane, may move too erratically for filming. However, the camera 36 is largely mechanically isolated from sudden vertical movements of the crane via the vertical axis isolator 40, as described above. The camera is also largely isolated from sudden horizontal movements by the assembly 204.

For example, in response to a sudden impulse or jolt in the forward direction, the camera 36 and the lower plate 224 pivot rearwardly (about axle or axis 213). The dampeners limit the speed and extent of the rearward movement. The camera 36 and the lower plate 224 then return to the home or initial position, via gravity. The return movement is similarly dampened by the dampeners. The return movement is advantageously selected to take about one second, regardless of the displacement, (like a pendulum).

When a shock or acceleration impulse is encountered, and the lower plate 224 pivots, the camera will not remain level. However, if as shown in FIG. 18, the camera is mounted on a gyro-stabilized camera head (for example as described in U.S. patent application Ser. Nos. 10/654,848 and 10/782,034, both incorporated herein by reference), the camera head will automatically compensate to keep the camera in a level position.

As described above, the isolator 40, together with the horizontal isolator assembly 110 or 204 can provide multiple degrees or modes of isolation. The horizontal isolator assembly 110 or 204 provides lateral isolation and longitudinal isolation. Additional or large movement vertical isolation is provided via the pivoting movement of the isolator arm 58. Elevation angulation compensation or correction is provided by the adjustable parallelogram linkage 102, as described above.

Thus, a novel and shock and/or vibration isolator for a camera has been shown and described. Various changes and modifications may of course be made without departing from the spirit and scope of the invention. The invention, therefore, should not be limited, except by the following claims and there equivalents.

The invention claimed is:

1. A camera support comprising:
a first member;
a second member;

a pivot joint connecting the second member to the first member, with the second member pivotable about a first axis and about a second axis;
at least one first dampener attached to the first member and to the second member, for dampening pivoting movement of the second member about the first axis;
at least one second dampener attached to the first member and to the second member, for dampening pivoting movement of the second member about the second axis; and
a camera head attached to the second member, with the second member between the first member and the camera head, and with the second member and the camera head forming a gravity centered pendulum connected to the first member only via the pivot joint and the dampening members.

2. The camera support of claim 1 wherein the first axis is perpendicular to the second axis.

3. The camera support of claim 2 wherein the first axis is co-planer with the second axis.

4. The camera support of claim 1 further comprising third and fourth dampeners attached to the first and second members, and with the first, second, third and fourth dampeners extending diagonally between the first and second members.

5. The camera support of claim 1 wherein:
the first member has first, second, third and fourth corners;
the second member has first, second, third and fourth corners;
the first dampening member having a first end attached adjacent to the first corner of the first member and having a second end attached adjacent to the fourth corner of the second member;
second dampening member having a first end attached adjacent to the second corner of the first member and having a second end attached adjacent to the first corner of the second member; and further comprising:
a third dampening member having a first end attached adjacent to the third corner of the first member and having a second end attached adjacent to the second corner of the second member; and
a fourth dampening member having a first end attached adjacent to the fourth corner of the first member and having a second end attached adjacent to the third corner of the second member.

6. The camera support of claim 5 wherein the first member comprises a first plate, and with the first, second, third and fourth dampening members oriented at an angle of about 30–60° to the first plate.

7. The camera support of claim 1 wherein the dampening members comprise hydraulic shock absorbers.

8. The camera support of claim 1 further comprising means for adjusting the dampening characteristics of the dampening members.

9. A camera support, comprising:
a vertical axis system including:
a base;
an arm pivotably attached to the base;
at least one spring connected to the base and to the arm;
at least one vertical axis system dampener connected to the base and to the arm;
a horizontal axis system supported by the vertical axis system, with the horizontal axis system including:
a first member;
a second member;
a pivot joint connecting the second member to the first member, with the second member pivotable about a first axis and about a second axis;
a first dampener attached to the first member and to the second member, for dampening pivoting movement of the second member about the first axis;
a second dampener attached to the first member and to the second member, for dampening pivoting movement of the second member about the second axis; and
a leveling linkage connecting to the base and to the horizontal axis system.

10. The camera support of claim 9 further including adjustment features for adjusting the leveling linkage to compensate for angulation movement of the base.

11. The camera support of claim 9 wherein the leveling linkage comprises a parallelogram linkage on the vertical axis system.

12. A camera crane, comprising:
a vehicle;
a crane arm attached to the vehicle;
a nose plate on the crane arm;
a vertical axis system including:
a base supported on the nose plate;
an arm pivotably attached to the base;
at least one spring connected to the base and to the arm;
at least one vertical axis system dampener connected to the base and to the arm; and
a horizontal axis system supported by the vertical axis system, with the horizontal axis system including:
a first member;
a second member;
a pivot joint connecting the second member to the first member, with the second member pivotable about a first axis and about a second axis;
a first dampener attached to the first member and to the second member, for dampening pivoting movement of the second member about the first axis;
a second dampener attached to the first member and to the second member, for dampening pivoting movement of the second member about the second axis; and
a leveling linkage connecting to the base and to the horizontal axis system, for maintaining the first member in a level position.

13. The camera crane of claim 12 further comprising a crane arm leveling system linked to the nose plate, for keeping the nose plate level as the elevation angle of the crane arm changes.

14. The camera support of claim 12 wherein a inner end of the arm is pivotably attached to the base, and an outer end of the arm is pivotably attached to a leveling plate, and wherein the leveling linkage maintains the leveling plate in a level position as the arm pivots up or down relative to the base, and wherein the horizontal axis system is supported on the leveling plate of the vertical axis system.

15. A camera support, comprising:
a base;
an arm pivotably attached to the base;
a leveling plate pivotally attached to the arm;
spring and dampening means associated with the arm for providing dampened shock absorbing movement of the leveling plate relative to the base;

leveling means for keeping the leveling plate level relative to the base;
a pendulum suspended from the leveling plate and free to pivot in two dimensions relative to the leveling plate;
a camera platform adjacent to a bottom end of the pendulum for holding a camera; and
pendulum dampening means for dampening movement of the pendulum.

16. A camera support, comprising:
a vertical shock absorbing system, including:
   a base;
   an arm pivotably aft ached to the base;
   a leveling plate pivotally attached to the arm;
   one or more springs and one or more arm dampeners associated with the arm for reducing transmission of shock impulses from the base to the leveling plate;
   a leveling linkage attached to the base and to the leveling plate; and
a horizontal shock absorbing system, including:
   a first plate pivotably connected to a second plate;
   one or more plate dampeners associated with the second plate for dampening pivoting movement of the second plate relative to the first plate; and
   a multiple axis stabilized camera head attached to the second plate.

17. A camera support, comprising:
a vertical shock absorbing system, including:
   a base;
   an arm pivotably attached to the base;
   a leveling plate pivotally attached to the arm;
   one or more springs and one or more arm dampeners attached to the base and to the arm;
   a leveling linkage pivotably attached to the base and to the leveling plate, with the leveling linkage automatically keeping the leveling plate level, regardless of movement of the arm; and
a horizontal shock absorbing system, including:
   an upper member pivotably connected to a lower member;
   one or more horizontal axis dampeners attached to the upper member and the lower member, with the lower member free to pivot relative to the upper member, except for dampening forces exerted on the lower member via the horizontal dampeners;
   a multiple axis gyro-stabilized camera head attached to the lower member, with the camera head having a camera mounting plate for attaching a camera to the camera head.

* * * * *